(12) United States Patent
    Klarman et al.

(10) Patent No.: US 10,970,690 B2
(45) Date of Patent: Apr. 6, 2021

(54) BLOCKCHAIN DISTRIBUTION NETWORK WITH SERVICE TRANSPARENCY

(71) Applicant: Northwestern University, Evanston, IL (US)

(72) Inventors: Uri Klarman, Evanston, IL (US); Aleksandar Kuzmanovic, Evanston, IL (US)

(73) Assignee: Northwestern University, Evanston, IL (US)

( * ) Notice: Subject to any disclaimer, the term of this patent is extended or adjusted under 35 U.S.C. 154(b) by 405 days.

(21) Appl. No.: 16/124,386

(22) Filed: Sep. 7, 2018

(65) Prior Publication Data

US 2019/0081779 A1   Mar. 14, 2019

Related U.S. Application Data

(60) Provisional application No. 62/557,330, filed on Sep. 12, 2017.

(51) Int. Cl.
    *H04L 9/08* (2006.01)
    *H04L 29/08* (2006.01)
    (Continued)

(52) U.S. Cl.
    CPC ....... *G06Q 20/102* (2013.01); *G06F 16/1834* (2019.01); *G06F 16/27* (2019.01); *G06Q 20/14* (2013.01); *G06Q 20/223* (2013.01); *H04L 9/0637* (2013.01); *H04L 9/0643* (2013.01); *H04L 9/0838* (2013.01);
    (Continued)

(58) Field of Classification Search
    CPC .... G06Q 20/102; G06Q 20/14; G06Q 20/223; G06F 16/27; G06F 16/1834; H04L 9/0637; H04L 9/0643; H04L 9/0838; H04L 9/3239; H04L 63/061; H04L 63/123;
    (Continued)

(56) References Cited

U.S. PATENT DOCUMENTS 4,650,975 A  *  3/1987  Kitchener .......... G06Q 20/3672
                                                235/375
5,813,003 A      9/1998  Chen et al.
(Continued)

FOREIGN PATENT DOCUMENTS

WO    WO 2016/161073 A1    10/2016

OTHER PUBLICATIONS

The Non-Final Office Action dated Oct. 13, 2020 for U.S. Appl. No. 16/124,245; pp. 1-30.
(Continued)

*Primary Examiner* — Shanto Abedin
(74) *Attorney, Agent, or Firm* — Bell & Manning, LLC

(57) ABSTRACT

A peer node in a blockchain distribution network includes a processor and a transceiver operatively coupled to the processor. The processor is configured to generate an encrypted test block. The encrypted test block is indistinguishable from an encrypted blockchain in the blockchain distribution network. The transceiver is configured to transmit the encrypted test block to a server for distribution throughout the blockchain distribution network. The transceiver is also configured to receive a message from a second peer node in the blockchain distribution network, where the message indicates that the second peer node received the encrypted test block.

18 Claims, 5 Drawing Sheets

(51) Int. Cl.

| | |
|---|---|
| *H04L 29/06* | (2006.01) |
| *H04L 9/06* | (2006.01) |
| *G06Q 20/10* | (2012.01) |
| *G06Q 20/22* | (2012.01) |
| *G06Q 20/14* | (2012.01) |
| *H04L 9/32* | (2006.01) |
| *G06F 16/27* | (2019.01) |
| *G06F 16/182* | (2019.01) |

(52) U.S. Cl.
CPC .......... *H04L 9/3239* (2013.01); *H04L 63/061* (2013.01); *H04L 63/123* (2013.01); *H04L 67/1074* (2013.01); *H04L 67/1078* (2013.01); *H04L 67/1091* (2013.01); *H04L 67/1093* (2013.01); *H04L 69/22* (2013.01); *H04L 9/3297* (2013.01); *H04L 2209/38* (2013.01); *H04L 2209/56* (2013.01)

(58) Field of Classification Search
CPC ............. H04L 67/1074; H04L 67/1078; H04L 67/1091; H04L 67/1093; H04L 69/22
See application file for complete search history.

(56) References Cited

U.S. PATENT DOCUMENTS

| | | | |
|---|---|---|---|
| 8,200,630 | B1 | 6/2012 | Park et al. |
| 9,135,787 | B1 | 9/2015 | Russell et al. |
| 9,219,667 | B2* | 12/2015 | Badea ................ H04L 43/50 |
| 9,241,049 | B2* | 1/2016 | Darcie ................ H04L 65/80 |
| 9,467,506 | B2* | 10/2016 | Kontothanassis ... H04L 67/1002 |
| 9,858,781 | B1 | 1/2018 | Campero et al. |
| 9,934,138 | B1* | 4/2018 | Bache ................ G06F 11/3688 |
| 10,417,217 | B2 | 9/2019 | Pierce et al. |
| 10,616,324 | B1* | 4/2020 | Kaddoura ............ H04L 43/04 |
| 2010/0318575 | A1* | 12/2010 | Murphy .............. G06F 11/1464 707/802 |
| 2016/0260095 | A1 | 9/2016 | Ford |
| 2016/0283941 | A1* | 9/2016 | Andrade ............... H04L 9/3247 |
| 2016/0292672 | A1* | 10/2016 | Fay ........................ G06Q 20/36 |
| 2016/0379330 | A1 | 12/2016 | Powers et al. |
| 2017/0005804 | A1 | 1/2017 | Zinder |
| 2017/0031676 | A1 | 2/2017 | Cecchetti et al. |
| 2017/0039553 | A1 | 2/2017 | Ghatage et al. |
| 2017/0054611 | A1 | 2/2017 | Tiell |
| 2017/0207917 | A1 | 7/2017 | Davis |
| 2018/0121923 | A1 | 5/2018 | Uhr et al. |
| 2018/0342036 | A1 | 11/2018 | Zachary |
| 2019/0036957 | A1* | 1/2019 | Smith ................... H04L 63/101 |
| 2019/0079952 | A1 | 3/2019 | Klarman et al. |
| 2019/0080304 | A1 | 3/2019 | Klarman et al. |
| 2019/0081773 | A1 | 3/2019 | Klarman et al. |
| 2019/0081777 | A1 | 3/2019 | Klarman et al. |
| 2019/0081778 | A1 | 3/2019 | Klarman et al. |
| 2019/0082007 | A1 | 3/2019 | Klarman et al. |
| 2019/0206272 | A1* | 7/2019 | Isozu .................... G06Q 50/20 |
| 2019/0379653 | A1* | 12/2019 | Mead .................. H04L 63/0838 |
| 2019/0384748 | A1* | 12/2019 | Roennow ............... G06F 21/64 |
| 2020/0076610 | A1 | 3/2020 | Wang |
| 2020/0145373 | A1* | 5/2020 | Richardson ............ G06Q 10/10 |
| 2020/0250676 | A1 | 8/2020 | Sierra et al. |

OTHER PUBLICATIONS

The Non-Final Office Action dated Oct. 15, 2020 for U.S. Appl. No. 16/124,698; pp. 1-29.

The Non-Final Office Action issued in U.S. Appl. No. 16/124,232 dated Jun. 16, 2020; pp. 1-16.

Eyal et al., Majority Is Not Enough: Bitcoin Mining Is Vulnerable, Communications of the ACM, vol. 61, No. 7, Jul. 2018, pp. 95-102.

Croman et al., On Scaling Decentralized Blockchains, In International Conference on Financial Cryptography and Data Security, Springer, Feb. 26, 2016, pp. 118-125.

Decker et al., Information Propagation in the Bitcoin Network, In Peer-to-Peer Computing (P2P), 2013 IEEE Thirteenth International Conference, 2013, pp. 1-10.

Kermani et al., Virtual Cut-Through: A New Computer Communication Switching Technique, Computer Networks 3, 1979, pp. 267-286.

Miller et al., Discovering Bitcoin's Public Topology and Influential Nodes, www.cs.umd.edu/projects/coinscope/coinscope.pdf, 2015, pp. 1-17.

Nakamoto, Bitcoin: A Peer-to-Peer Electronic Cash System, https://bitcoin.org/en/bitcoin-paper, Jan. 1, 2008, pp. 1-9.

International Search Report and the Written Opinion for PCT/US2018/049831 dated Nov. 9, 2018, pp. 1-9.

Barber et al., Bitter to Better—How to Make Bitcoin a Better Currency, crypto.stanford.edu/~xb/fc12/bitcoin.pdf, 2012, pp. 399-414.

Bitcoin Will Need to Scale to Levels Much Higher Than Visa, Mastercard, and PayPal Combined, https://coinjournal.net/bitcoin-will-need-to-scale-to-levels-much-higher-than-visa-mastercard-and-paypal-combined/, Oct. 16, 2015, pp. 1-4.

State of the Bitcoin Network, https://.hackingdistributed.com/2017/02/15/state-of-the-bitcoin-network/, Feb. 15, 2017, pp. 1-9.

None-Final Office Action issued on U.S. Appl. No. 16/124,232, dated Nov. 1, 2019.

Tomescu et al., "Catena: Efficient Non-equivocation via Bitcoin," International Association for Cryptologic Research, vol. 20170319:232151, Mar. 20, 2017, XP061022717, DOI : 10.1109/SP.2017.19, pp. 1-17.

The Extended European Search Report issued in European Patent Appl. No. 18799423.1 dated Apr. 29, 2019, pp. 1-9.

\* cited by examiner

US 10,970,690 B2

BLOCKCHAIN DISTRIBUTION NETWORK WITH SERVICE TRANSPARENCY

CROSS-REFERENCE TO RELATED APPLICATION

The present application claims the priority benefit of U.S. Provisional Patent Application No. 62/557,330, filed on Sep. 12, 2017, the entire disclosure of which is incorporated by reference herein.

BACKGROUND

A blockchain network refers to a distributed system that can be used to facilitate transactions among parties. A typical blockchain network lacks centralized administration, and instead relies on mediation by a global peer-to-peer (p2p) network of participants. A blockchain includes an unalterable shared ledger that records a history of transactions. Because the blockchain ledger is unalterable and available to all involved parties of a given transaction, there is a reduced likelihood of fraudulent transactions and erroneous ledgers. The use of a blockchain can also eliminate the need of a business to worry about disparate ledgers, that would otherwise need to be reconciled.

SUMMARY

An illustrative server in a blockchain distribution network includes a processor and a transceiver operatively coupled to the processor. The transceiver is configured to receive bytes of a transaction from a first peer node. The transceiver is also configured to propagate the bytes of the transaction to one or more additional peer nodes and to one or more additional servers in the blockchain distribution network. The transceiver is also configured to receive bytes of a blockchain from a second peer node. The blockchain includes information regarding a plurality of transactions, and the plurality of transactions includes the transaction. The transceiver is further configured to propagate the bytes of the blockchain to the one or more additional peer nodes and to the one or more additional servers in the blockchain distribution network.

An illustrative method of propagating data in a blockchain distribution network includes receiving, by a transceiver of a server, bytes of a transaction from a first peer node. The method also includes propagating, by the transceiver, the bytes of the transaction to one or more additional peer nodes and to one or more additional servers in the blockchain distribution network. The method also includes receiving, by the transceiver, bytes of a blockchain from a second peer node, where the blockchain includes information regarding a plurality of transactions, and where the plurality of transactions includes the transaction. The method further includes propagating, by the transceiver, the bytes of the blockchain to the one or more additional peer nodes and to the one or more additional servers in the blockchain distribution network.

An illustrative server in a blockchain distribution network includes a processor and a transceiver operatively coupled to the processor. The transceiver is configured to receive a transaction from a peer node. The processor is configured to assign a transaction identifier to the transaction. The transceiver is configured to propagate the transaction identifier to one or more additional peer nodes and one or more additional servers in the blockchain distribution network. The transceiver is configured to receive bytes of a blockchain that represents a plurality of transactions. The blockchain includes the transaction identifier corresponding to the transaction. The transceiver is further configured to propagate the bytes of the blockchain to the one or more additional peer nodes and to the one or more additional servers in the blockchain distribution network.

An illustrative method of propagating data in a blockchain distribution network includes receiving, by a transceiver of a server in the blockchain distribution network, a transaction from a peer node. The method also includes assigning, by a processor operatively coupled to the transceiver, a transaction identifier to the transaction. The method also includes propagating, by the transceiver, the transaction identifier to one or more additional peer nodes and one or more additional servers in the blockchain distribution network. The method also includes receiving, by the transceiver, bytes of a blockchain that represents a plurality of transactions, where the blockchain includes the transaction identifier corresponding to the transaction. The method further includes propagating, by the transceiver, the bytes of the blockchain to the one or more additional peer nodes and to the one or more additional servers in the blockchain distribution network.

An illustrative server in a blockchain distribution network includes a processor and a transceiver operatively coupled to the processor. The transceiver is configured to receive bytes of an encrypted blockchain from a peer node in a peer-to-peer network, where the server is unable to identify a source node that generated the encrypted blockchain based on the received bytes. The transceiver is also configured to propagate the bytes of the encrypted blockchain to one or more additional peer nodes and to one or more additional servers in the blockchain distribution network.

An illustrative method of propagating information in a blockchain distribution network includes receiving, by a transceiver of a server in the blockchain distribution network, bytes of an encrypted blockchain from a peer node in a peer-to-peer network. The server is unable to identify a source node that generated the encrypted blockchain based on the received bytes. The method also includes propagating, by the transceiver, the bytes of the encrypted blockchain to one or more additional peer nodes and to one or more additional servers in the blockchain distribution network.

An illustrative peer node in a blockchain distribution network includes a processor and a transceiver operatively coupled to the processor. The processor is configured to generate a blockchain that includes information regarding a plurality of transactions. The processor is also configured to encrypt the blockchain. The transceiver is configured to propagate bytes of the encrypted blockchain to a second peer node that is in communication with a server of the blockchain distribution network.

An illustrative peer node in a blockchain distribution network includes a processor and a transceiver operatively coupled to the processor. The processor is configured to generate an encrypted test block. The encrypted test block is indistinguishable from an encrypted blockchain in the blockchain distribution network. The transceiver is configured to transmit the encrypted test block to a server for distribution throughout the blockchain distribution network. The transceiver is also configured to receive a message from a second peer node in the blockchain distribution network, where the message indicates that the second peer node received the encrypted test block.

An illustrative method of peer-to-peer communication in a blockchain distribution network includes generating, by a processor of a first peer node, an encrypted test block, where the encrypted test block is indistinguishable from an encrypted blockchain in the blockchain distribution network. The method also includes transmitting, by a transceiver of the first peer device, the encrypted test block to a server for distribution throughout the blockchain distribution network. The method further includes receiving, by the transceiver, a message from a second peer node in the blockchain distribution network. The message indicates that the second peer node received the encrypted test block.

An illustrative system for use in a blockchain distribution network includes a plurality of peer-to-peer nodes and a plurality of central servers in communication with at least a portion of the plurality of peer-to-peer nodes. The plurality of peer-to-peer nodes includes a first peer node and a second peer node and the plurality of central servers includes a first central server. The first peer node includes a first transceiver that is configured to transmit a blockchain to the second peer node. The second peer node includes a second transceiver that is configured to relay the blockchain to the first central server such that the first central server is unable to identify an origin of the blockchain.

An illustrative method of communicating in a blockchain distribution network includes generating, by a processor of a first peer node, a blockchain, where the blockchain includes information regarding a plurality of transactions. The method also includes transmitting, by a first transceiver of the first peer node, the blockchain to a second peer node. The method also includes relaying, by a second transceiver of the second peer node, the blockchain to a central server such that the first central server is unable to identify an origin of the blockchain.

An illustrative system for implementing payments in a blockchain distribution network includes a first peer node that includes a first processor configured to generate a blockchain that includes information regarding a plurality of transactions. The plurality of transactions includes a plurality of fee transactions that each result in a payment to the blockchain distribution network. For each of the plurality of fee transactions, the first processor is configured to generate payment details to facilitate the payment to the blockchain distribution network. The first processor is also configured to associate the payment details with each of the plurality of fee transactions. The first peer node also includes a first transceiver operatively coupled to the first processor and configured to transmit the blockchain for distribution throughout the blockchain distribution network.

An illustrative method for implementing payments in a blockchain distribution network includes generating, by a first processor of a first peer node, a blockchain that includes information regarding a plurality of transactions. The plurality of transactions includes a plurality of fee transactions that each result in a payment to the blockchain distribution network. The method also includes generating, by the first processor and for each of the plurality of fee transactions, payment details to facilitate the payment to the blockchain distribution network. The method also includes associating, by the first processor, the payment details with each of the plurality of fee transactions. The method further includes transmitting, by a first transceiver of the first peer node that is operatively coupled to the first processor, the blockchain for distribution throughout the blockchain distribution network.

An illustrative peer node in a blockchain distribution network includes a processor configured to generate a blockchain, where the blockchain includes information regarding a plurality of transactions. The processor is also configured to determine that the peer node is being discriminated against with respect to blockchain transmissions by one or more central servers of the blockchain distribution network. The processor is further configured to determine, based at least in part on the determination that the peer node is being discriminated against, that one or more servers in a sentinel network are to be used for blockchain transmissions instead of the one or more central servers. The peer node further comprises a transceiver operatively coupled to the processor and configured to transmit the blockchain through the sentinel network.

An illustrative method of communicating in a blockchain distribution network includes generating, by a processor of a peer node, a blockchain, where the blockchain includes information regarding a plurality of transactions. The method also includes determining, by the processor, that the peer node is being discriminated against with respect to blockchain transmissions by one or more central servers of the blockchain distribution network. The method also includes determining, by the processor based at least in part on the determination that the peer node is being discriminated against, that one or more servers in a sentinel network are to be used for blockchain transmissions instead of the one or more central servers. The method further comprises transmitting, by a transceiver operatively coupled to the processor, the blockchain through the sentinel network.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

DETAILED DESCRIPTION

Figure 1:
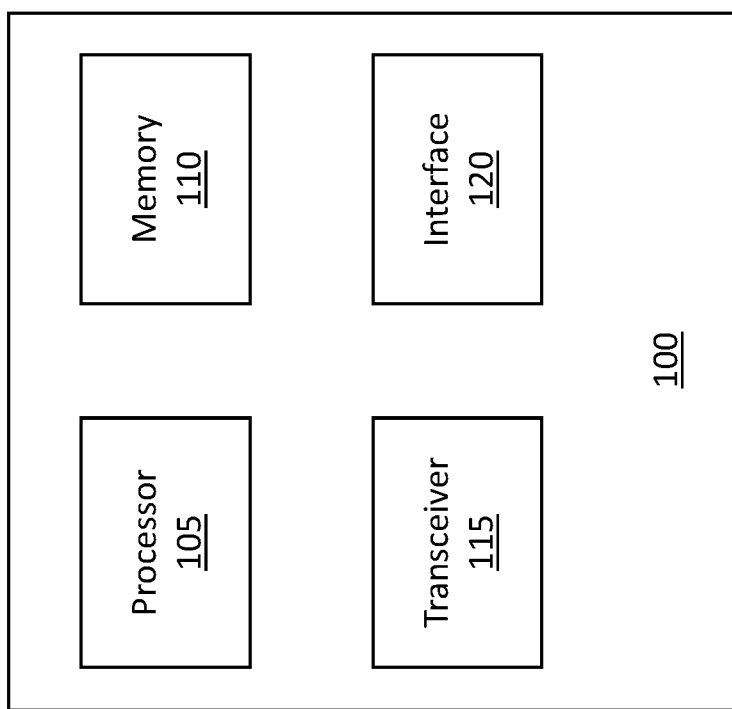
FIG. 1 is a block diagram depicting a server in a blockchain distribution network in accordance with an illustrative embodiment.

Blockchains are purely distributed systems that lack centralized administration and instead rely on mediation by a global peer-to-peer (p2p) network of participants. While such a design brings significant opportunities and disruptive potential in many areas, it is also the source of a key problem in existing blockchain networks, which is scalability. As an example, a well-known blockchain referred to as Bitcoin has a throughput 3-4 orders of magnitude smaller than that of a centralized counterpart, such as a major credit card carrier network. Described herein is a system that allows for blockchain scalability that is attained via a centrally-managed network infrastructure. The described system also allows for complete decentralization of control over transactions in that blockchain, attained via neutral and auditable design of the centrally managed network.

More specifically, the system described herein is a blockchain distribution network (BDN) that disseminates transactions and blocks on behalf of existing peer-to-peer blockchain nodes. It is shown that the present system increases a blockchain throughput by approximately one thousand times without affecting the functionality of the blockchain or the balance of power among current system participants. This system is achieved in part by promoting neutral network design as the first-order priority for the system. The system described herein is the first to combine a legacy p2p and a centrally managed BDN in which the p2p network is used to audit the BDN and assess its neutrality. The system is also protocol-agnostic and designed to support multiple blockchains simultaneously.

The system described herein can be relied upon to scale blockchain systems because the proposed system propagates encrypted data from unknown origins, which prevents the system from discrimination and censorship. The proposed system is the first blockchain distribution system to encrypt blocks prior to propagation in the network. The proposed system is also the first to propagate keys within a blockchain network. The keys are propagated in parallel by both system servers and directly between peers in the p2p network. Additionally, the keys are propagated only after the blocks to which they correspond have been propagated in the network, which makes it too late for the network to reject them. The proposed system is also the first blockchain network to allow the sending of test blocks to see if they are propagated through the network. The test blocks allow the peer nodes to monitor the system, as discussed in more detail below.

The present system is also the first to allow relaying of encrypted blocks through peers to the centralized system, to hide both the content and the origin of the blocks, thereby helping to prevent discrimination. The present system is also the first system to combine a p2p network and a centralized system such that the peers can audit the behavior of the centralized system. The present system is also the first to use a centralized system to provide each transaction (which is ~550 bytes) with a short ID, or transaction identifier, having a size of ~2-3 bytes. By propagating a block that contains short IDs corresponding to transactions, as opposed to the transactions themselves, the actual amount of data in each block is considerably reduced. The block recipients are provided with information that enables them to translate back from short IDs to transactions. The proposed system is also the first to support multiple blockchain systems simultaneously. The present system is further the first to suggest that each transaction will include a fee to the centralized system, and the first to use the peers to validate that the fees are actually paid to the centralized system. These unique features and attributes are described in more detail below.

The following is a discussion of existing blockchain distribution systems and some of their limitations. Bitcoin is the first blockchain system and the first crypto-currency to gain considerable traction globally, with a market capitalization of over 50 billion U.S. dollars. A unique feature of Bitcoin is the lack of centralized administration. Rather, Bitcoin relies on third party mediation in the form of a global p2p network of participants that validate and certify all transactions. Given the purely distributed and decentralized design of blockchains, it is believed that systems such as Bitcoin have a disrupting potential in many other areas beyond crypto-currencies, including healthcare, government, manufacturing, retail, insurance, Internet of Things (IoT), sharing economy, etc.

A major problem for blockchains is scalability, which is fundamentally hindered by the distributed system design and limitations of the underlying p2p network model, as discussed in more detail below. In particular, a blockchain system throughput is measured in terms of the number of transactions per second (TPS) that the system can support. Currently, Bitcoin has reached its capacity with an average throughput of 2.67 TPS. For comparison to a centralized system, such as Visa, the average throughput is 2,000 TPS, with a daily peak at around 4,000 TPS, and a peak capacity at 56,000 TPS. Without scalability, crypto-currency systems cannot become mainstream, and blockchains are unlikely to realize their disruptive potential in other areas such as those identified above.

At its core, Bitcoin is a distributed system which allows its users to hold a balance and make transactions of Bitcoins, i.e., of currency, and maintain a single distributed ledger of all transactions. Transactions are not added to the ledger individually, rather, they are added in batches, which are referred to as blocks. The result is a chain of blocks which contains the entire history of all Bitcoin transactions, known as the blockchain.

To understand how Bitcoin transactions are created and the blockchain maintained, assume user A is buying an item from another user B, and wishes to pay for it in Bitcoin. Each user controls a wallet, which is a simple private key and a public key pair. To pay user B, user A locally creates a new transaction, which passes some amount of Bitcoins from her public key, also known as her address, to the address of user B. User A signs the transaction using her private key. User A then propagates the transaction to all other Bitcoin users. The Bitcoin network, which contains all Bitcoin users, is a p2p network. Every Bitcoin user, also referred to as nodes, or peers, who receives the transaction validates that (i) all the transactions paying Bitcoins to user A's address, minus the sums spent from her address, leave a balance which is greater than or equal to the amount spent in the transaction, and (ii) that the transaction contains a signature which requires knowledge of user A's private key to be created. If these two conditions hold, the transaction is deemed valid, and users which receive it will propagate it to their peers. It is worth noting that a single entity may control any number of wallets, and that each wallet can control any number of public keys.

In addition to regular Bitcoin users, some nodes in the Bitcoin network attempt to aggregate the transactions they receive into new blocks, which will be added to the blockchain. It is only once a transaction is included in the blockchain that it is considered to have taken place, while transactions which still await to be included have not. Such nodes are called miners, and the process of attempting to create a new block is known as mining. There are two monetary incentives for mining. First, each block contains a unique transaction, the coinbase transaction, which passes some amount of Bitcoins to the miner's address. The block's coinbase transactions also provide the supply of Bitcoins, as it creates Bitcoins. The amount of Bitcoin produced in each block decreases exponentially over time, limiting the total supply to approximately 21 million Bitcoins. Second, each Bitcoin transaction can carry a fee to whichever miner successfully includes it in a block, and miners are incentivized to include the transactions with the highest fees, since the number of transactions included in each block is limited.

To mine a new block, a miner hashes all the transactions to be included in the block, using a double SHA-256 hashing function. In addition to the transactions, the miner also hashes a timestamp, the result of hashing the previous block, and an arbitrary binary value, known as a nonce. For a new block to be created, i.e., for successful mining, the result of the hashing must be very small. Thus, miners exhaustively try different nonce values, in an attempt to find one which produces a small enough value. The exact target value changes over time in an effort to maintain an average of one block every 10 minutes, based on the timestamps of the blocks.

Once a new block is found, it is propagated to the entire Bitcoin network in a way similar to transactions (i.e., it is validated by each node prior to its propagation). It is safe for the successful miner to propagate its block, including the nonce, since the nonce only yields a small enough value for the newly-mined block, without any change done to it. A dishonest user cannot utilize the nonce to create an alternative block, e.g., with a coinbase transaction which passes Bitcoins to the wallet of the dishonest node. Such a change will cause the block's hashing to yield a different value, and the nonce has the same probability as any other arbitrary value to yield a value smaller than the target.

A critical aspect of blockchain security is that the hashing of each block also includes the value yielded from hashing the block preceding it. The immediate result of this inclusion, is that any attacker attempting to alter the history of transactions, i.e., the inclusion, exclusion, or alteration of a transaction in some previous block, will change the value its hashing yields. This in turn will affect the hashing value of all consecutive blocks, and almost certainly invalidate each and every one of them. For such an alteration to succeed, the attacker would have to sequentially find a new nonce for every block. Moreover, the attacker would have to do so at a higher rate than the rate at which all other miners extend the original blockchain. Thus, for such an attack to succeed, the attacker must control the majority of hashing power in the Bitcoin system. It has been shown that entities controlling less than 50% of the hashing power can gain unfair advantage, and thus can eventually eliminate smaller miners and gain majority of hashing power. However, the above-described security primitive based on block hashing differentiates Bitcoin and blockchain systems from previous decentralized systems.

A unique feature of Bitcoin, and of blockchain systems in general, is their inherent ability to overcome inconsistent views of the transaction history in a distributed manner, by defining the blockchain which requires the most computation to produce as the 'true' blockchain. To demonstrate this ability, consider two miners which happen to successfully mine a new block at approximately the same time. The two blocks differ from each other as they will contain different coinbase transactions, use different nonces, and it is very likely the transactions included in each of them are not identical. Once the two blocks are mined, they are propagated in parallel to the entire Bitcoin network, resulting in some portion of the network considering one history of transactions to take place, while others consider a slightly different version of transaction history to take place. Such a situation, where two or more equally valid blockchain versions exist is called a fork. While a fork is unresolved, there exists some ambiguity regarding which transactions have taken place.

Forks are resolved once a new block is mined, as it causes one prong of the fork to become longer than others, which in turn incentivizes miners to abandon the shorter prongs and attempt to mine over the longest blockchain, as any rewards gained on shorter prongs are likely to be orphaned (i.e., discarded). Thus, the Bitcoin system converges to the longest blockchain due to the selfish interests of the miners.

It is possible yet rare for blocks to be mined for two prongs of a fork at approximately the same time, which keeps the fork unresolved, until one becomes longer than the other.

Due to the possibility of forks, it is possible for a transaction to be included in a block, yet not to be included in the blockchain if the block is orphaned. The probability for a block to be orphaned exponentially decreases as more blocks are mined on top of it, in direct relation to the probability for two blocks to be mined on two prongs of a fork at approximately the same time. Thus, transactions are considered more secure as additional blocks are mined on top of the blocks containing them.

The Bitcoin model, as outlined above, does not depend on any centralized entity to track balances or to execute transactions, nor can any single entity undo transactions, confiscate Bitcoins, or alter the blockchain in any way without control over a majority of the hashing power. To enforce new transactions on behalf of users, such an entity will be required to break the SHA-256 hashing. Bitcoin is thus considered a trustless system since users do not depend on any central entity to perform any action on its behalf, or to provide it any information, such as wallet balances, upon which it relies.

In Bitcoin, as in other cryptocurrencies and blockchain systems, system throughput is measured by the number of transactions per second (TPS) it supports. Since the Bitcoin network produces one 1 MB block once every 10 minutes, on average, and average transaction size is 544 bytes, the Bitcoin system handles an average of 1764 transactions per 10 minutes, or 2.94 TPS. In comparison, as discussed above, Visa performs 2000 TPS on average, with an average daily peak of 4000 TPS, and can support up to 56,000 TPS. Moreover, cryptocurrencies aim to enable low fee transactions of very small sums (mircropayments), which are expected to involve a considerably higher throughput than Visa, MasterCard, and Paypal combined.

The Bitcoin system throughput directly depends on 2 parameters: the block size (B), i.e., the number of bytes which can contain transactions in each block, and the inter-block time interval ($t_B$), which is the average time required for the system to mine a new block. As noted above, in Bitcoin B=1 MB and $t_B$=600 seconds, which allows 2.94 TPS. To improve Bitcoin's throughput, it is possible to increase the B to include more transactions, and to reduce $t_B$, so that blocks are mined at a higher rate. However, these parameters also critically affect the system decentralization, usability, and security, as detailed below.

Traditional blockchains, such as Bitcoin, are not easily scalable. The inventors have determined that block propagation time is the limiting factor of the throughput in such a blockchain system. The inventors have also determined that increasing system throughput negatively affects block propagation time, which in turn reduces the security and the usability of blockchain systems.

If newly-mined blocks were instantaneously propagated to the entire Bitcoin network, it would be possible for it to process thousands of TPS, using larger blocks B mined at shorter time intervals $t_B$, as it has been shown that a modern processor can support thousands of TPS, while disk I/O can support hundreds of thousands of TPS. In contrast, Bitcoin's networking aspects in general are much more constrained. While p2p protocols have been proven capable of quickly propagating data among peers (e.g., Bittorrent), Bitcoin and other blockchain systems differ from classical p2p networks by requiring the continuous delivery of all blocks to all peers.

Unlike traditional p2p systems, Distributed Denial of Service (DDoS) attacks are prevalent in blockchain systems, and are used to gain advantages in mining, voting, and other business-related and protocol-related activities. To prevent malicious nodes from flooding the network with invalid blocks, nodes use a store-and-forward propagation model, where each node must first download and validate every block, prior to propagating it to its peers. This model allows nodes to identify any node which propagates invalid blocks as malicious, and limits the effect of such attacks to the nodes which are directly attacked.

Block propagation time directly affects the security and usability of the blockchain, since it defines the time window in which forks occur. As this time window increases in size, the probability of a fork increases by a similar factor. Considering Bitcoin mining, which follows the exponential distribution with a mean of 600 seconds ($t_B$=600), and the block propagation to 90% of the network ($t_{90}^{th}$) to be the block propagation time, the probability for a fork to occur while a new block is mined approximates:

$$P(\text{fork} | t_B = 600) = 1 - e^{\frac{-t_{90^{th}}}{600}} \quad \text{Equation 1}$$

Thus, the probabilities of a fork to occur where, e.g., $t_{90}^{th}$=0.9, 9, and 90 seconds, are 0.1499%, 1.489%, and 13.93%, respectively.

The increase in fork probability has an exponential effect on the probability for a fork to last several blocks, requiring more blocks to be mined before a transaction is considered safe. For example, the probability for a fork to last 6 blocks when $t_{90}^{th}$=9 seconds is almost 1,000,000 times larger than when $t_{90}^{th}$=0.9 seconds. Moreover, to match the low probability of a transaction to be orphaned after 6 confirmations where $t_{90}^{th}$=0.9 seconds, i.e., after 5 blocks had been mined after it was included in a block, a transaction in which $t_{90}^{th}$=9 seconds must have 10 confirmations.

Block propagation time also directly affects the ability of nodes to participate in the Bitcoin network, as nodes must be capable of receiving blocks at a higher rate than they are produced. Failing to achieve this, nodes cannot track the balances stored in the blockchain, and thus they cannot determine the validity of transactions and blocks, and are in effect excluded from the Bitcoin network. To allow 90% of nodes to remain in the network, the block to propagation time for 90% of the network must be smaller than the inter-block time interval $t_{90}^{th} < t_B$.

Another effect of block propagation time is on the profitability of miners. Once a new block is mined, miners which have not yet received the new block become considerably less profitable, as any block they mine will cause a fork and are likely to be orphaned. The probability for a block to be orphaned depends on the rate at which it is propagated to the network. Thus, it is in the best interest of miners to receive blocks as soon as possible, and to have their own blocks propagate as fast as possible. Large mining operations, known as mining farms, invest large sums in mining hardware and infrastructure, and their investment in networking infrastructure is proportionally small, leveraging the economies of scale. Small mining operations invest proportionally larger sums to achieve the same networking performance, and are thus less profitable. Since the security of Bitcoin and other blockchain systems depend on the decentralization of mining, such a centralization force has an adverse effect on their security.

In the year 2017, the Bitcoin network included approximately 9,000 nodes (N=9,000), the majority of which are connected to 8-12 of their peers, with a median latency between peers of approximately 110 milliseconds. At the 50$^{th}$ percentile, node upload rate is 56 Mbps ($bw_{50}^{th}$=56 Mbps), while the 10$^{th}$ and 1$^{st}$ percentiles have a rate of 3.96 Mbps and 438 Kbps, respectively. Thus, the upload rate at the 50$^{th}$, 10$^{th}$, and 1$^{st}$ percentile supports 13,000,943 and 100 TPS, respectively. It is noted that global bandwidth measurements show that download rates exceed upload rates by a factor of 1.85-5.81, with the exception of low constraint regions where the average bandwidth exceeds 100 Mbps.

The bandwidth of individual Bitcoin nodes supports increasing the system throughput by orders of magnitude, and the latency among peers is not so abnormally high as to pose a barrier. However, while individual nodes can easily support higher TPS, it is the distributed propagation which Bitcoin and other blockchain systems employ that significantly limits the system throughput.

As discussed above, in order for Bitcoin to function as a decentralized system, it must allow nodes to receive blocks at a higher rate than the blocks are produced. Indeed, if blocks are produced at a higher rate than a node is capable of receiving them, then the node cannot keep track of balances stored in the blockchain, cannot determine whether or not transactions and blocks are valid, and is in effect excluded from the Bitcoin Network. The block propagation time to the majority of the network ($t_{50}^{th}$) does not depend solely on a receiving node bandwidth. Rather, it depends on network topology, the bandwidth of all nodes, and the manner in which blocks propagate.

The time that it takes for a block to propagate through the system, and how it is affected by the block size (B), can be roughly approximated based on the number of nodes (N) and their median bandwidth ($bw_{50}^{th}$). For a median Bitcoin node, the time to transmit a single 1 MB block to a single peer ($t_{hop}$) is roughly:

$$t_{hop} = \frac{B}{bw_{50^{th}}} = \frac{1 \text{ MB}}{56 \text{ Mbps}} = 0.143 \text{ seconds} \quad \text{Equation 2}$$

Assuming 8 peers, the average Bitcoin node will use approximately $8t_{hop}$ to propagate a block to its peers, regardless of whether such propagation is done sequentially or in parallel. However, sequential propagation allows the first peer of a node to propagate the received block after $t_{hop}$ has passed, while parallel propagation will only allow peers to propagate the block after $8t_{hop}$. Thus, to hasten block propagation when bandwidth is limited, nodes would ideally propagate blocks to their peers sequentially, rather than in parallel.

Using sequential propagation, a newly-mined block is known only to a single node, i.e., its miner, at time t=0, to two nodes, the miner and its first peer, at time t=$t_{hop}$, to 4 nodes at time t=$2t_{hop}$, and to a majority of the network at time:

$$t_{50}^{th} = [\log 2(N)]t_{hop} = 13 t_{hop} = 1.86 \text{ seconds} \quad \text{Equation 3:}$$

While this approximation does not account for network congestion, download bandwidth, message exchange overhead, latency, packet loss, the arbitrary topology of the nodes, or bandwidth consumed for transactions propagation, it does provide insights regarding block propagation time ($t_{50}^{th}$).

It is noted that while the network size (N) effect over the block propagation time ($t_{50}^{th}$) is logarithmic, the effect of block size (B) is linear. For example, increasing the system TPS by a factor of 10 by increasing the block size to B=10 MB would increase the time required for the median node to transmit a block to a single peer by the same factor, $$t_{hop} = \frac{10 \text{ MB}}{56 \text{ Mbps}} = 1.43 \text{ seconds.}$$

This, in turn, would increase the block propagation time to the majority of the network by the same factor to $t_{50}^{th}=13 t_{hop}=18.6$ seconds. The linear effect of block size (B) on block propagation time ($t_{50}^{th}$) has also been empirically found in various studies, when block size (B) exceeds 20 KB.

The positive and negative effects of increasing block size (B), i.e., increased system throughput, reduced blockchain security, and node exclusion, are symmetric to the effects of reducing the average time required to mine a new block ($t_B$) by the same factor. For example, doubling the block size (B) would increase the system throughout by a factor of 2, and the same is achieved by halving the inter-block time interval ($t_B$). Similarly, doubling the block size will approximately double the block propagation time ($t_{90}^{th}$), which in turn will double the probability of forks as follows:

$$P(\text{fork}) = 1 - e^{\frac{-t_{90^{th}}}{t_B}} \quad \text{Equation 4}$$

It is noted that halving the inter-block time interval ($t_B$) will have the same effect. Also, doubling to include 90% of the nodes in the network, the block propagation time at the $90^{th}$ percentile must be smaller than the inter-block time interval ($t_{90}^{th} < t_B$). Doubling the block size (B) would increase block propagation time ($t_{90}^{th}$) by a similar factor, which will have the same effect as halving $t_B$.

While the system described herein is the first BDN that comprehensively addresses the blockchain scaling problem (i.e., via transaction propagation and indexing, block propagation, neutral and auditable BDN design, etc.), advanced block propagation for a subset of nodes (miners) has been deployed in the context of the Bitcoin network. In particular, in order to minimize the negative effects of long block propagation times, as well as to put smaller miners on equal terms with larger mining farms, centralized Bitcoin relay networks were deployed.

The first relay network to be deployed, referred to as the Bitcoin Fast Relay Network (BFRN), relays blocks using multiple gateways around the globe to reduce block propagation time for miners. The BFRN focuses on utilizing low-latency connections to reduce the block propagation time which is the result of ineffective routing and geographic distances. The BFRN was later replaced by the Fast Internet Bitcoin Relay Engine (FIBRE), which uses a similar architecture while utilizing fiber-optic wires and forward error correction (FEC) to further reduce latency and packet error rate. The goal of FIBRE was to minimize the number of round trip times (RTTs) required to propagate a block.

The Falcon network was another attempt to reduce latency. The Falcon network follows similar principals to FIBRE, yet it also aims to reduce block propagation time further by avoiding the need to receive an entire block prior to propagating it. Instead, Falcon utilizes a cut-through routing scheme, where gateways to the relay network relay the first bytes of an inbound block as soon as they arrive, rather than wait for the entire block to arrive.

While both FIBRE and Falcon provide an effective service to the Bitcoin network, the Bitcoin system cannot rely on them to achieve higher throughput without subjecting itself to their control and forfeiting the unique decentralized nature of the Bitcoin network. The administrator of a relay network can reject blocks containing specific addresses, and can thus censor and limit the usage of the blockchain. The administrator of the relay network can also avoid relaying blocks from or to specific miners, and serve only a subset of miners, providing them with influence which exceeds their proportional computational power, thus breaking the security model of the blockchain. The relay network administrator behavior could be malicious, selfish, or obliged by national and international laws.

The deployment of BFRN, FIBRE, and Falcon has had a significant effect on block propagation time, reducing it from 1-2 minutes to several seconds. Unfortunately, this improvement prevents any real-world block propagation measurement which does not use a relay network. The inventors therefore focused on block propagation measurements taken prior to the deployment of such relay networks, in conjunction with simulations which are based on recent networking measurements.

Another proposed scaling solution for blockchain networks, known as side-channels or off-chain transactions, suggests that parties will use 'smart contracts' which set aside some amount of the parties' currency. The set aside currency is then used by the parties to transact among themselves numerous times, until such time that the smart contract expires, and the result of all the transactions done are returned to the involved parties. Another approach, known as 'sharding,' splits the blockchain into several smaller 'shards,' which are maintained and interleaved in a fashion that aims to keep the original security properties of the blockchain. Other approaches, such as Bitcoin-NG and Scepter, replace blocks by a stream of transactions, or forgo them altogether, while still other systems aim for nodes to place trust in specific nodes, and to assure their honest behavior through the ability to replace them.

While the above approaches may have some potential, their robustness, security, usability, and adaption remains to be proven. More importantly, side-channels still require the use of multiple on-chain transactions to open and close smart contracts, while sharding requires scale per shard, making them compatible and in need of an on-chain scalability solution. The propagation needs of Scepter and Bitcoin-NG remain to be seen, if they are ultimately deployed.

System Design

Given the above-described deficiencies in existing blockchain networks, one goal of the present system is to enable crypto-currencies and blockchain systems to scale to thousands of on-chain transactions per second. Moreover, the present system aims to provide scalability to numerous crypto-currencies and blockchain systems simultaneously, utilizing a centrally managed infrastructure to support distributed blockchain systems in a provably neutral fashion.

The system described herein represents a fundamental change in approaching the blockchain scaling problem. Instead of strictly relying on a purely distributed system design, the system embraces a blockchain distribution network (BDN) to enable blockchain scaling without compromising the decentralization of control over transactions in the blockchain. The key challenges are to design such a BDN to be neutral and auditable by a global peer network, while retaining existing blockchain functionality, properties, and balance of power among current system participants.

To achieve scalability, the present system disseminates both transactions from peer network nodes to the rest of the peer network, and blocks that aggregate transactions from miners to the rest of the peer network. Unique to the design of the present system is its ability to effectively index all the transactions in the system with identifiers (IDs) that are approximately two orders of magnitude shorter than the original transactions. This in turn reduces the effective block size, and increases system throughput, by the same two orders of magnitude. In addition, the swift, coordinated, cut-through block propagation via the system servers adds one additional order of magnitude in throughput relative to the state-of-the art p2p blockchain systems, leading to an approximate 1000 fold overall increase in system throughput (i.e., TPS).

Neutrality refers to the propagation of blocks without knowledge of the transactions they contain, their number, their sums, the wallets involved, the addresses involved, the miner to produce each block, or the IP address of a miner that mined the block. In addition, miners are free to include arbitrary transactions in a block, even those that were not originally distributed and indexed by the system. Furthermore, the system, or its administrator, cannot infer the above characteristics even when colluding with other nodes of the peer network, or by analyzing the timing and size of blocks. The system is unable to favor specific nodes by providing them blocks ahead of others, and cannot prevent any node from joining the system and utilizing it. The system can either fairly propagate all blocks, or none of them.

To achieve neutrality and enable its auditing, the present system supports encrypted blocks, which prevents the system from stopping the block propagation based on its content or any other feature. An encryption key for the block is only revealed after the block has been propagated through the network. To ensure that the system is not discriminating against individual nodes, clients do not propagate blocks directly to the system servers, but instead relays them via peers in the peer network, obscuring the origin of the block from the system BDN servers. To prevent the system BDN servers from blocking or stalling blocks arriving from a particular set of nodes, clients are able to audit the system by testing its service and communicating the results to other peers. Clients are therefore allowed to send test blocks directly to the system. Additionally, a sentinel network is available and ready to assume the role of the system BDN servers in case the system fails to faithfully serve the peer network nodes, whether deliberately, or as a result of a large-scale system failure.

The system as a whole is protocol-agnostic, and capable of providing its scaling services to numerous crypto-currencies and blockchains simultaneously. In addition, the system is an economically sustainable system. Economic sustainability is accomplished by enabling existing endpoints to directly assign a fraction of the fees intended for miners to the system blockchain distribution network (BDN) servers. The overall effect, enabled by system scaling, is beneficial to all involved parties. For example, miner earnings can increase by 10× and client fees can be reduced by 100×, making the system BDN economically viable.

To summarize, the present system is the first BDN system that utilizes a centrally managed infrastructure to scale blockchains without affecting the decentralization of control over transactions in a blockchain. The system increases a blockchain throughput by ~1000× compared to traditional networks via efficient content dissemination and by providing a mapping service between transactions and short IDs, thus reducing the traffic volume. The proposed BDN system is the first networking system to scale blockchain systems as a whole, rather than just increasing fairness or reducing latency for individual nodes. Network neutrality is defined for the first time in the context of blockchains, and as discussed in detail below, the inventors have designed, implemented, and evaluated the first such neutral BDN, and demonstrated its fairness and anti-discriminatory properties.

The system is also the first to combine a p2p and centrally managed BDN network where the p2p network is used to audit the centrally managed network and assess its neutrality. The proposed system is the first system to include direct on-chain payments for BDN services, a feature that is only incrementally deployable in existing crypto-currencies, thus making BDN services a first-class citizen in the blockchain ecosystem for the first time. The proposed system is also the first to provide a BDN network that can support multiple blockchains, agnostic to their implementation and protocols. The proposed system is also the first to combine a p2p network and a centrally managed BDN network to prohibit the BDN network from censoring content. The system is further the first to introduce a sentinel network to protect against large-scale discrimination and collusion attempts.

The trust model of the present system is based on two observations. First, it has been observed that trustless p2p blockchains such as Bitcoin cannot scale to thousands of on-chain transactions per second, due to their long block propagation time, as discussed above. Second, it has been observed that better scalability is achievable by placing trust in a small subset of participants, and passing them the control over the transactions included in the blockchains, e.g., Ripple, EOS, BitShares, Steem, etc. However, such centralization defeats the single most notable aspect of distributed blockchains, which is the distribution and decentralization of control over transactions. Providing control over transactions in a blockchain to a limited number of participants allows those participants to collude, censor, and discriminate between users, nodes, and miners. Provision of control to such a limited number of participants can also easily make those participants accountable for the transactions they include by law enforcement.

Rather than placing trust in a subset of nodes to enable scalability, the present system utilizes a trust model that reverses the direction of trust, and enables scalability using a subset of nodes which must place trust in the entire network. The system utilizes a BDN system to enable scaling, yet nodes need not place any trust in the BDN. Instead, the BDN system blindly serves the nodes, without knowledge of the blocks it propagates, their origin, or their validity. Moreover, the behavior of the BDN is constantly audited by the nodes it serves, and it is incapable of discriminating against individual nodes, blocks, or transactions. While such design places the BDN system at a disadvantage compared to the nodes utilizing it, its robustness allows it to withstand dishonest and malicious behaviors, as discussed in more detail below.

In an illustrative embodiment, the proposed BDN system includes a plurality of system servers, a plurality of peer nodes in a peer network, and a sentinel network of nodes. FIG. 1 is a block diagram depicting a system server 100 in a blockchain distribution network in accordance with an illustrative embodiment. As indicated in FIG. 1, the system server 100 includes a processor 105, a memory 110, a transceiver 115, and an interface 120. In alternative embodiments, fewer, additional, and/or different components may be included in the system server 100. The memory 110 can be any type of computer-readable medium that is configured to store computer-readable instructions to implement any of the operations, programs, and algorithms described herein. The processor 105 is configured to execute the computer-readable instructions stored in the memory 110. The processor 105 is also configured to control the transceiver 115 such that blocks, packets, and other information can be received and transmitted by the system server 100. The transceiver 115, which is used to receive/transmit information, can be any type of transceiver. The transceiver 115 can be in the form of a single component that both sends and receives, or alternatively the transceiver 115 can be in the form of a distinct receiver and a distinct transmitter. The interface 120 can be any type of input/output (I/O) component such as a display, keyboard, mouse, data port, etc. that allows an individual to interact with the server 100.

Figure 2:
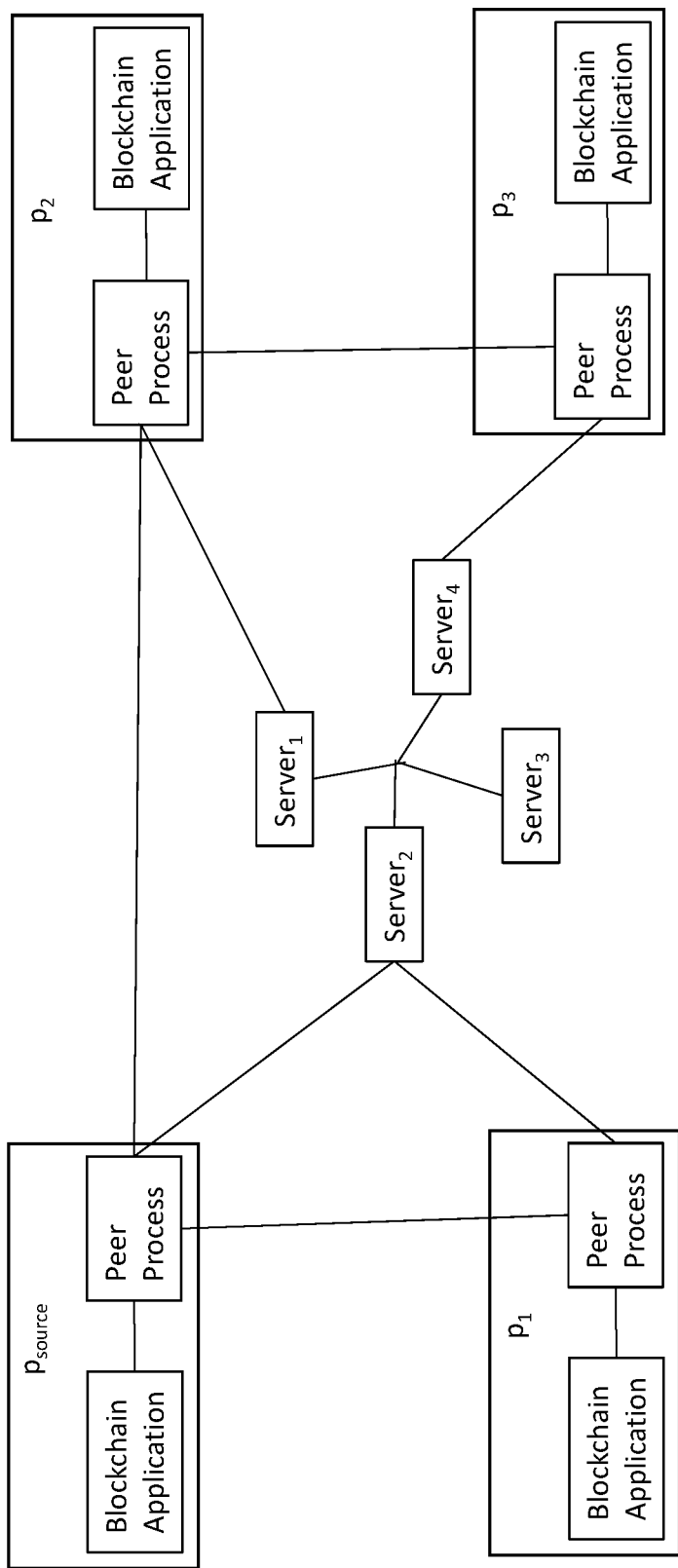
FIG. 2 is a diagram that depicts interaction between system servers and peer nodes in a blockchain distribution network in accordance with an illustrative embodiment.

FIG. 2 is a diagram that depicts interaction between system servers and peer nodes in a blockchain distribution network in accordance with an illustrative embodiment. The system servers form a high capacity, low latency, global BDN network that is optimized to quickly propagate transactions and blocks for multiple blockchain systems. The peer nodes of FIG. 2 (i.e., $p_{source}$, $p_1$, $p_2$, $p_3$) are p2p network nodes which utilize the system servers to propagate transactions and blocks, while carefully auditing the behavior of the overall BDN. The present system can include a plurality of p2p networks, in which each peer network includes all of the nodes using a specific protocol. For example, all of the Bitcoin nodes utilizing the system servers form a first peer network, while all of the Ethereum nodes utilizing the system servers can form a second peer network. In the embodiment of FIG. 2, each node in the peer network includes a peer process and a blockchain application. A given peer node runs its peer process as an intermediary between its blockchain application and the system servers. Although the diagram of FIG. 2 depicts 4 system servers and 4 peer nodes for illustration, it is to be understood that a typical BDN will include significantly more system servers and peer nodes.

In addition to the aforementioned system servers and the peer network(s), the system can also include a backup network, which is referred to as a sentinel network. The sentinel network (not shown in FIG. 2) is a distributedly-managed global network of servers, ready to assume the role of the system servers should the need arise. While the system servers remain operational, the sentinel network does not propagate any traffic.

The system servers propagate blocks on behalf of the nodes in the peer network(s). However, contrary to relay networks, the system servers propagate blocks without knowledge of the transactions they contain, their number, their sums, the wallets or addresses involved, the miner that produced each block, or the IP address from which a block enters the BDN. Furthermore, the system servers, or their administrator, cannot infer the above characteristics even when colluding with other nodes of the peer network, or by analyzing block timing and size. The system servers cannot favor specific nodes by providing them blocks ahead of others, and cannot prevent any node from joining the system and utilizing it. The system servers can either fairly propagate all blocks, or none of them, and are incapable of discrimination.

The BDN as a whole is protocol-agnostic, providing its scaling services to numerous cryptocurrencies and blockchains simultaneously. The system servers operate at the transport layer of the open systems interconnection (OSI) model, interacting with both the application layer and the networking layer, and provide service to whichever blockchain protocol is running at the application layer. However, some of the functionalities of the system servers fall under the application layer, a design decision which allows compatibility with both new and existing cryptocurrencies. More specifically, functionalities which fall under the networking layer include receiving blocks from the blockchain application, sending blocks to other peers, block encryption, sending encryption keys, and receiving unencrypted blocks from peers. Functionalities which fall under the application layer include the use of the transmission control protocol (TCP) and user datagram protocol (UDP) to send data, the discovery of peers, connecting the blockchain application to the peer process, and sending test blocks to ensure that the BDN network is not discriminating.

In order to reduce transaction size by orders of magnitude, and thus to reduce block size and propagation time, each transaction is matched with a short ID, which is consistent across all parts of the system. Using these short IDs, blocks are propagated containing only the transaction IDs, rather than the transactions themselves, to minimize blocks size. After an encrypted block is received by a node, and once the node receives the encryption key needed to decrypt it, the node is then able to translate the short IDs back to transactions, prior to testing the validity of the received block.

Unlike distributed systems, where such techniques open the door to attack vectors based on ID collision, the present system, being a centralized system, can use IDs safely and in a more efficient manner by using shorter IDs. This allows the system to increase its throughput by orders of magnitude, as for any given block size, more transactions can be included.

For a transaction to be matched with an ID, the transaction is sent to the system servers by any of the nodes they serve, which may or may not be the transaction creator. The system servers then disseminate the transaction alongside its ID to all the nodes it serves, as well as a time-to-live (TTL) field, which specifies the longevity of the mapping between the transaction and the ID. Such a mapping between transactions and corresponding IDs is then cached at peer nodes. This process allows peer nodes to effectively shorten the size of a block (by using IDs instead of raw transactions). At the same time, the mapping helps receiving peer nodes reassemble the raw blocks by converting from IDs to raw transactions.

Figure 3:
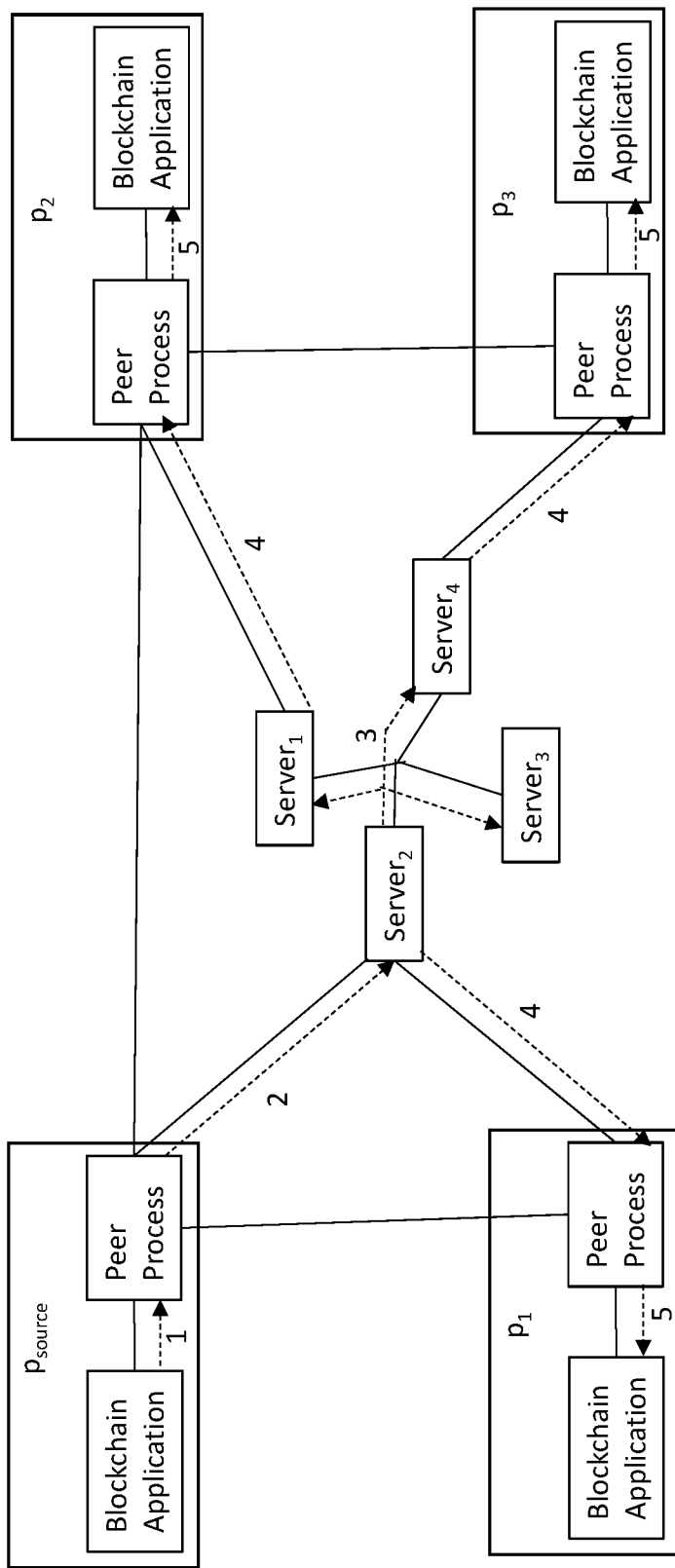
FIG. 3 depicts block propagation by the system in accordance with an illustrative embodiment.

To enable blockchain scalability, the system servers propagate blocks quickly and efficiently to all peer network nodes, as shown in FIG. 3. Once a newly mined block is found by a node ($p_{source}$) of the peer network, whether mined by $p_{source}$ or propagated to it by its peers, the block will be disseminated in a process that can include 5 operations. In alternative embodiments, fewer or additional operations may be performed. FIG. 3 depicts block propagation by the system in accordance with an illustrative embodiment.

As illustrated in FIG. 3, at a first operation (1), a blockchain application at $p_{source}$ passes a raw block to a peer process associated with $p_{source}$. The system is compatible with all blockchain applications, and the peer process is used as an intermediary between the blockchain application and the system servers. The peer process can include hardware and/or software as known in the art of p2p networking. At a second operation (2), the peer process shortens the block via transaction IDs and transmits the block to one of the system servers (i.e., Server$_2$). At a third operation (3), a system server that received the block distributes the block to all other system BDN servers as the block is received. More specifically, as the first bytes of the block are received at the system server, they are immediately propagated to all other system servers without waiting for the entire block to be received. At a fourth operation (4), system servers propagate the block to all peers, and this is again dones as the block is received. More specifically, as the first bytes of the block are received at all of the system servers, they are immediately propagated to the peer processes running at all of the peer network nodes ($p_1$, $p_2$, $p_3$, and so on), without waiting for the entire block to be received. At a fifth operation (5), peer processes validate block structure, reassemble the raw block, and pass the assembled block to a blockchain application. All of the peer network nodes ($p_1$, $p_2$, $p_3$) are expected to receive the block in its entirety approximately 2 RTTs after $p_{source}$ completes the block transmission to the initial system server.

Figure 4:
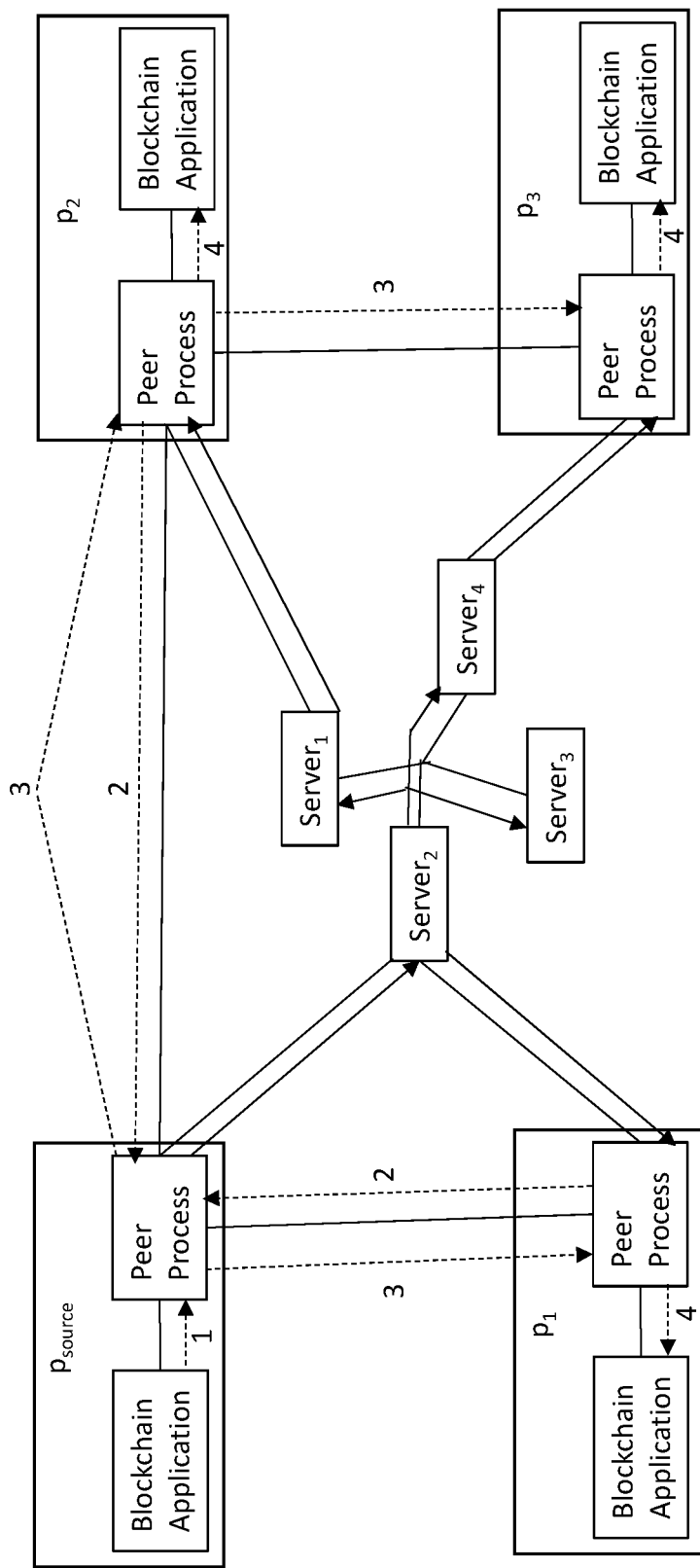
FIG. 4 depicts both encrypted and unencrypted block propagation in a blockchain distribution network in accordance with an illustrative embodiment.

To prevent the system servers from rejecting blocks based on the transactions they contain, the block dissemination process discussed above can be extended to include encryption. FIG. 4 depicts both encrypted and unencrypted block propagation in a BDN in accordance with an illustrative embodiment. In FIG. 4, encrypted block propagation is depicted by a dotted arrow line that extends over a solid arrow line which represents unencrypted block propagation. With reference to encrypted block propagation, at a first operation (1), a blockchain application of $p_{source}$ passes a raw block to a peer process of $p_{source}$, which shortens and encrypts the block, and propagates the encrypted block to all of the peer network nodes ($p_1$, $p_2$, $p_3$) via the system servers. At a second operation (2), each of the nodes ($p_1$, $p_2$, $p_3$) notifies its peers of the received encrypted block using the encrypted block's hash value. At a third operation (3), once the peer node $p_{source}$ receives notifications from its peers ($p_1$ and $p_2$) that the encrypted block has been propagated, $p_{source}$ propagates the encryption key required to decrypt the block using p2p propagation and the system servers. At a fourth operation (4), each peer process that receives the propagated encryption key decrypts the encrypted block, validates the structure of the block, reassembles the raw block, and passes the raw block to the blockchain application.

Figure 5:
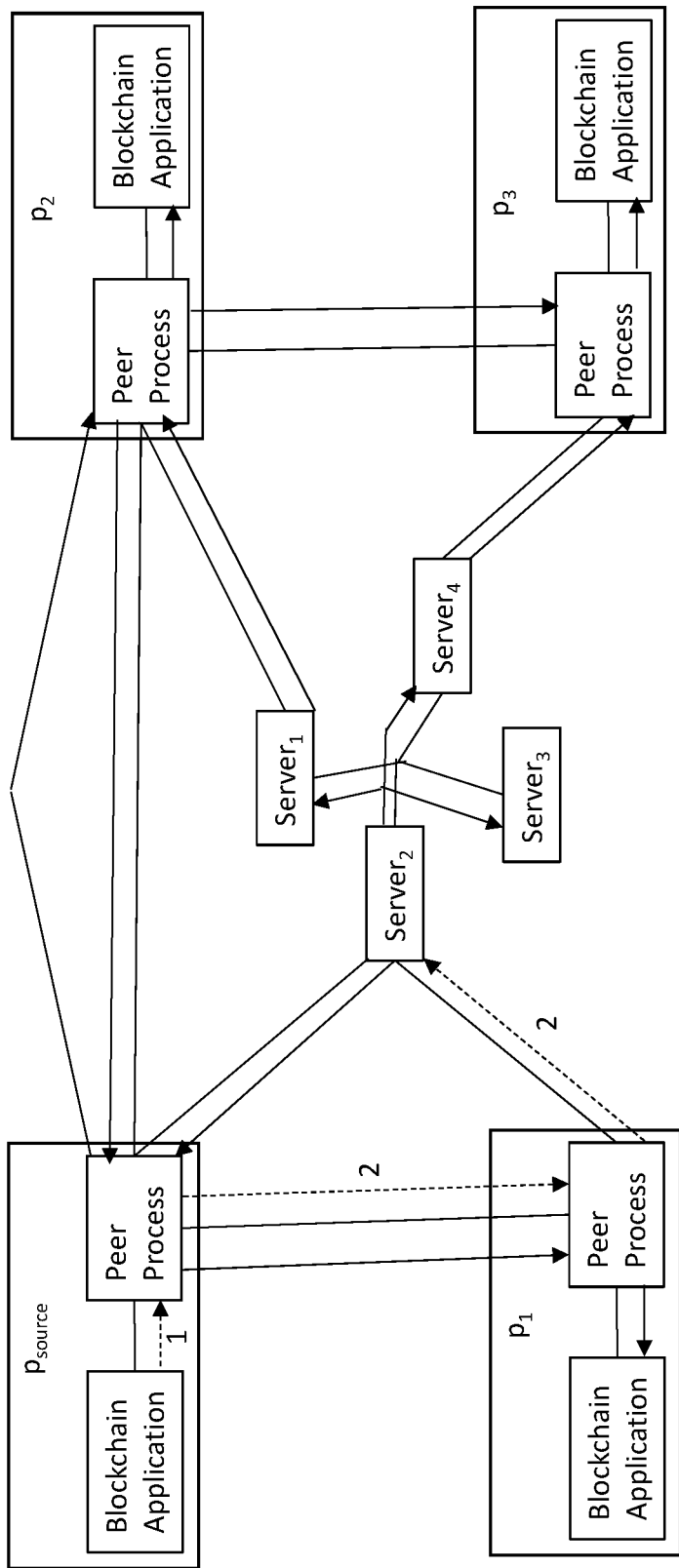
FIG. 5 depicts a block propagation process that includes peer-relayed encrypted block propagation in accordance with an illustrative embodiment.

To prevent the system BDN from rejecting blocks based on their origin, i.e., based on the source node attempting to propagate a newly mined block, blocks are not sent directly to system servers. Rather, blocks are relayed to system servers via a peer, obscuring their origins. FIG. 5 depicts a block propagation process that includes peer-relayed encrypted block propagation in accordance with an illustrative embodiment. In FIG. 5, peer relayed encrypted block propagation is indicated by a dotted arrow line that extends over an encrypted block propagation that is represented by a solid arrow line. In a first operation (1), the blockchain application of a source node $p_{source}$ passes a block to its peer process, which shortens and encrypts the block. In a second operation (2), the peer process of $p_{source}$ relays the encrypted block, along with the unencrypted block's header to a peer, which in this example is $p_1$. The recipient peer ($p_1$) validates the header and then relays the encrypted block to a system server. The block dissemination then follows the encrypted block propagation discussed above with reference to FIG. 4.

In an illustrative embodiment, the above-referenced block header can be an 80 byte block header. Alternatively, a different length header can be used. The block header includes a version field, a previous block header hash field, a Merkle root hash field, a time field, an nBits field, and a nonce (i.e., an arbitrary binary value) field. In alternative embodiments, fewer, additional, and/or different fields may be included in the block header. For a block to be valid, the hashing of these fields has to be very small, i.e., smaller than the nBits field, which is a very small binary value. Thus, in order to create a new block, miners can try different arbitrary values in the nonce field until one of them works. A result is that it takes a lot of work to create a valid header, which makes it highly unlikely and expensive for an individual to create a valid header for an invalid block. Analysis of the block header is therefore almost certainly enough to test whether the block is valid, and peer nodes can determine whether to further relay the block based on whether the block is found to be valid.

The BDN also provides a provably neutral block dissemination service by allowing its clients (i.e., the peer network nodes) to continuously monitor its behavior using test-blocks, and through its ability to propagate unvalidated encrypted data. This puts the BDN at a disadvantage in comparison to its clients, and opens the door to resource-wasting malicious behavior, which the BDN is robust enough to withstand.

The BDN robustness and service incurs costs mainly in the form of the delivery of large traffic volumes to a large number of nodes. For example, one can assume a network of 10,000 full nodes, which is similar in size to today's Bitcoin network. Each of these nodes in the network may create, for example, four 1 MB test-blocks per day, and the BDN would be delivering 100 TB per day, or 9.26 Gbps. At the same time, assuming transactions are created at a rate of 3,000 TPS, their delivery would utilize an additional 132 Gbps. It is noted that the bandwidth utilized to support test-blocks increases exponentially as the number of full nodes increases, while the bandwidth required to support higher TPS does not. The cost of supporting a reliable, low-latency, global infrastructure which immediately delivers these large traffic volumes is non-negligible.

To assure sustainability of the BDN, transactions of blockchain systems which utilize the BDN may be required to pay an additional fee to the BDN. This BDN fee has several key properties. The BDN fee is minuscule in comparison to the fees reduced for users, and to the sum of fee increases for miners, due to the scalability it allows. For each transaction, the BDN fee is 10% of the miner fee, and the BDN system's public address is added as an additional payee. Such a fee is very small in comparison to the several orders of magnitude increase to the system throughput, which translates to an order of magnitude fees reduction for users and an order of magnitude increase in fees collected by miners, while keeping the BDN profitable and sustainable. Additionally, defining the BDN fee as a percentage of the miner fee assures that the incentive mechanism to prioritize transactions based on their fees remains unaffected.

While most transactions in the BDN result in a fee paid to the BDN system, in one embodiment ~20% of the size of each block can be dedicated for transactions which do not include such a fee. In alternative embodiments, a different percentage may be used such as 5%, 10%, 15%, 25%, 30%, etc. The BDN differentiates between three types of transactions which can be included in a block, a fee transaction, a no fee transaction, and a no ID transaction. Fee transactions are transactions which were mapped to a short ID by the BDN and include a fee to the BDN system. No fee transactions are transactions which were mapped to a short ID by the BDN and do not include such a fee. No ID transactions are transactions which were not mapped to a short ID by the BDN.

In an illustrative embodiment, the BDN system fees are implemented by peer network nodes and not by the BDN because the BDN propagates blocks without knowledge of their content. Whenever a peer receives (and decrypts) a newly-mined block, it validates that at least 80% of the block's size is used for fee transactions. Otherwise, the peer rejects the block. In alternative embodiments, a different percentage may be used, such as 70%, 90%, etc. Additionally, the use of an additional payee increases the size of transactions, but not the block size, since transactions are represented using short IDs regardless of their size. Thus, this process only increases the bandwidth used for transaction dissemination, which grows linearly with the size of the network and the system throughput, as opposed to exponentially.

The present BDN also employs several discrimination prevention mechanisms to ensure that the BDN propagates all blocks fairly, and is incapable of discriminating against any node, miner, block, transaction, or wallet. Block discrimination can be based on content of the block such as wallets, addresses, sums of the transactions in a block, timestamps, coinbase transactions, or any other attributes. To prevent discrimination based on block content, all blocks are encrypted prior to propagation. The BDN encryption alters the block size, which hides the number of transactions in the block and their total size. A block's encryption key ($k_1$) is only revealed after the block had been propagated, and is propagated directly over the peer network. The minuscule size of $k_1$, which can be as small as several bytes, allows it to quickly propagate directly over the peer network, and the BDN is powerless to stop it.

Another anti-discrimination mechanism used by the BDN is indirect relay upon initial propagation of a block. To help ensure that the BDN is not preventing individual nodes from propagating their blocks, whether based on a node IP address, node operator identity, node implementation, or any other attribute, nodes do not propagate blocks directly to the BDN servers. Instead, a node wishing to propagate a block will first propagate it to a peer on the peer network, which will relay it to a BDN server, thereby obscuring the origin of the block from the BDN.

In addition to indirectly relaying blocks to the BDN, nodes may request that their peers relay incoming blocks to them that arrive from the BDN. This ensures that the BDN cannot be used to discriminate against nodes through late delivery of blocks, and that nodes are not required to directly interact with the BDN in order to benefit from its service. The short delay (i.e., ~0.5 RTT) that such nodes experience for utilizing such a relay overlaps with the time required for nodes to receive $k_1$, nulling any negative effect.

While the BDN is oblivious to the node that originates each block, it may potentially still block or stall blocks arriving from some subset of nodes, affecting all of the blocks that are relayed by the subset. In order to detect and measure such behavior, nodes in the peer network are able to continuously test the BDN's service, and to communicate the results to their peers. Such testing is achieved by allowing nodes to send encrypted invalid blocks, referred to as test blocks, through the BDN. The sending nodes are then able to measure the time that it takes for the recipient peers to report the arrival of the test blocks. Because of the encryption, the BDN servers are unable to distinguish between test blocks and valid blocks. The BDN servers are therefore unable to employ a discriminating policy only over valid blocks, while faithfully propagating test blocks. From the perspective of the BDN servers, test blocks and valid blocks are indistinguishable until their keys are published. When a test block is distributed, any recipient peer nodes then communicate the measurement results to their peers.

As noted above, the BDN system can also utilize a sentinel network. The sentinel network is a global distributed network of servers, which is ready to assume the role of the system servers in the event that the system servers fail to faithfully serve the peer network nodes, either deliberately or as a result of a large-scale system failure. The sentinel network runs the same open-source code as the system servers, and is generally meant to run over private virtual clouds (PVCs), e.g., AWS, Microsoft Azure, Digital Ocean, Rackspace, etc. which can provide high-bandwidth and low-latency communication.

The sentinel network differs from the BDN servers in two critical aspects. First, while the BDN servers are centrally-managed, the sentinel network is a distributed network that allows anyone to join it. The operators of sentinel network servers run them in addition to and separately from their peer network nodes. This allows the sentinel network servers to act based on any discrimination their peer networks nodes observe. Second, whereas the BDN servers distribute large volumes of traffic, and thus incur high operational costs, the sentinel network servers will only propagate traffic if the system servers fail to faithfully distribute traffic, and their operational costs are therefore minimal. The primary role of the sentinel network is thus not to be used to propagate traffic. Rather, the primary role is to provide an alternative to the system servers, allowing the peer network nodes not only to monitor the BDN, but also to abandon the system servers should the need arise. The existence of such an alternative is enough to deem futile any colluding attempt by the system servers and/or peer network nodes. The sentinel network is thus passive, despite being an important component to ensure neutrality of the BDN system.

As discussed above, a key attribute of the BDN system is the ability of peer network nodes to audit the behavior of the BDN and to abandon it if the need arises. To that end, nodes relay test blocks to the BDN, and are able to determine whether their peers quickly receive them. However, the BDN and/or colluders could potentially attempt to relay a block from a given node only to its immediate peers, and not to the entire peer network. Such action could cause the originating node to falsely believe its blocks are relayed to the entire network. To prevent such a behavior, peer network nodes do not reveal all of the nodes that they are aware of. Instead, nodes conceal half of the nodes that they are aware of, including half of their immediate peers. Thus, if an adversary were to analyze the known peers of a node, it will be unable to determine which nodes are its immediate peers and which are not. In alternative embodiments, nodes may conceal a different percentage of the nodes they are aware of and/or their immediate peers, such as 40%, 45%, 55%, 60%, etc.

Included below is an analysis of the different forms of discrimination that a centralized BDN might attempt to employ, along with a discussion of how the above-discussed anti-discrimination mechanisms prevent the BDN from employing them. As discussed above, one form of discrimination is to stall or prevent the propagation of blocks based on block content such as wallets, addresses, sums of the transactions in the block, timestamps, the coinbase transactions in the block, or any other attribute. To prevent the BDN from such discrimination, blocks are encrypted prior to propagation. Furthermore, the encryption alters the block size to hide the number of transactions in the block and their total size. Each block's unique encryption key $k_1$, which is needed to decrypt the block, is only revealed after the block had been propagated. Also, the minuscule size of the key $k_1$ allows it to quickly propagate directly over the peer network, and the BDN is powerless to stop its propagation.

Another form of discrimination is to prevent individual nodes from propagating their blocks. Such discrimination can be based on IP address of the node, the identity of the operator of the node, node implementation, or any other node attribute. To ensure that the BDN cannot discriminate in this fashion, peer network nodes relay their blocks indirectly. Rather than transmitting a block directly to a system server, an originating node propagates a block to a system server through one or more of its peers, thereby preventing the recipient system server from knowing the origin of the blocks it receives.

Another form of discrimination is to stall or drop blocks arriving from a large subset of nodes, affecting all the blocks that are relayed by the subset. However, if it is assumed that un-discriminated nodes are not actively colluding with the BDN, relaying blocks though such un-discriminated nodes negates the discrimination. Peer network nodes are able to periodically propagate test blocks through the BDN to ensure that their blocks are indeed being propagated to the entire network in an unhindered fashion. Prevention and negation of collusion are discussed in more detail below.

While transaction dissemination in the proposed BDN enables higher system throughput, it is possible that the BDN can attempt to reject transactions and/or to demand unauthorized payment for the BDN service. To prevent the BDN from these forms of discrimination, approximately 20% of the size of each block is allowed to be dedicated to unmapped transactions, i.e., transactions which have not been mapped to an ID. In alternative embodiments, the percentage of block size that can be dedicated to unmapped transactions can be less than or greater than 20%, such as 5%, 10%, 15%, 25%, 30%, etc. Allowing unmapped transactions to be included in the block, combined with the encryption of blocks before they are relayed to the system servers, allows miners to include any transaction in the blockchain. Importantly, this requirement is enforced by the peer network nodes, and not by the system servers. As such, nodes will reject blocks which do not follow the requirement. This mechanism ensures that the majority of transactions are indeed mapped to IDs by the BDN, thus allowing orders of magnitude higher throughput. At the same time, this process prevents the system servers from rejecting specific transactions, or blocks which contain specific transactions.

There are several forms of block delivery discrimination which a centralized BDN network might employ. First, the BDN can discriminate in favor of some nodes, delivering them blocks ahead of other nodes. Second, the BDN can discriminate against individual nodes by postponing block delivery, or not delivering them blocks at all. Third, the BDN can cease to deliver blocks to a majority of nodes, and only serve a small subset of nodes. Lastly, the BDN can cease to deliver blocks completely, either maliciously or as a result of system failure.

To prevent the BDN from discriminating in favor of individual nodes, a block's encryption key $k_1$ is only propagated after the node which originated it ($p_{source}$) learns of the block's propagation from its peers. Thus, any node ($p_{privileged}$) to receive the block ahead of time will be forced to wait until it receives $k_1$ from its peers, which will only commence once the block is delivered to the arbitrary peers of $p_{source}$, thus placing $p_{privileged}$ on a par with its peers.

To protect themselves from late block delivery, nodes compare between their own test block arrival time and those of their peers, which will indicate whether or not they are being discriminated against. If a node identifies such discrimination, nodes can request that their peers relay block traffic directly to them, as soon as the traffic arrives. This will place the discriminated nodes on par with their peers, as the short delay they suffer (~0.5 RTT) overlaps with the time required for $k_1$ to propagate.

If the BDN ceases to deliver blocks completely, or only delivers blocks to a small subset of nodes, whether deliberately or as a result of a large-scale failure, the sentinel network will assume the role of the system servers, and the nodes will abandon the system servers until the matter is resolved.

As discussed above, it is critical to prevent the BDN from censoring or delaying blocks based on their content or origin. It is also critical to prevent discrimination in favor of or against any nodes utilizing it, even if the BDN colludes with nodes of the peer network. It is noted that the design of the present BDN does not aim to solve the problem of colluding such as a 51% attack, nor to minimize its effectiveness. Rather, the design goal of the BDN is to not increase the effectiveness of existing attacks, and to not enable new attacks.

As outlined above, encrypted blocks are indirectly transmitted to the system servers, to prevent the system from discriminating against blocks, whether based on their content or the nodes which originated them. However, colluding nodes might not relay blocks to the system servers. Further, such colluding nodes might share their knowledge of arriving blocks to allow the system servers to reject such blocks afterwards, when the blocks are relayed by non-colluding nodes. Such attacks are bound to fail, however, as they require the system servers to reject all incoming test blocks, which in turn immediately alerts all nodes to the discrimination, and causes them to abandon the BDN in favor of the sentinel network.

As an example, $p_{source}$ can relay b, $b^{t1}$, and $k_1$ to $p_1$, in a scenario in which $p_1$ is actively colluding with the system servers. To prevent or delay the propagation of b, colluders will refrain from propagating $b^{t1}$ to the entire peer network, and possibly share all knowledge of $p_{source}$, b, $k_1$, and $b^{t1}$ among themselves. Once $p_{source}$ relays the block to $p_1$, it starts relaying b, $b^{t1}$, and $k_1$ to additional peers $\{p_i|>1\}$, until it learns of a block that was successfully relayed. For the attack to succeed, the BDN must avoid or delay the propagation of blocks $\{b^{t1}|>1\}$ as they arrive from their respective nodes. Failing to do so, the attack will only delay the propagation of b by the time required for $p_{source}$ to relay the block to its first non-colluding peer, which is identical to the same attack vector in the p2p trustless model.

Since $p_{source}$ selects its peers at its own discretion, each peer $p_i$ relays a version of b which is encrypted with a different key, and the encryption obscures both the content and size of b, it is impossible for the BDN to distinguish between incoming test blocks and encrypted versions of b. Thus, to affect the propagation of b, the BDN must refuse all incoming blocks arriving from non-colluding nodes, possibly until a different block is provided by the colluding nodes. Such behavior is immediately visible to all the nodes of the peer network, as they will fail to get reports of arrival for their own test blocks. In such a scenario, nodes immediately move to the sentinel network, which causes the attack to fail, and furthermore causes the nodes to abandon the colluding system servers in the short term. The system servers can be replaced in the long term.

It is noted that a necessary condition for the attack to be launched is for $p_1$, which is the first peer to which $p_{source}$ relays the block, to be colluding with the system servers. It is further noted that deliberate failure to relay blocks is already an existing attack vector in the existing p2p trustless model, with the same probability of success. The result in both models, which is delaying the propagation of a b until it is sent to $p_i$, the first non-colluding node, is identical. While blockchain systems utilizing the BDN are likely to use blocks which contain more transactions, the number of bytes utilized to send a block to a peer network node is greatly reduced, due to the usage of short IDs to represent transactions. These effects negate each other, resulting in the attack having a similar level of effectiveness.

It is further noted that while it is also possible for the BDN to reject only a portion of blocks arriving from non-colluders, rather than all of them, such an attack is even less effective. For example, rejecting 50% of blocks arriving from non-colluders will only delay the propagation of b by half the time (on average) required to relay a block through a peer, while being clearly visible to at least 50% of the nodes. Increasing the percentage of rejected nodes increases the visibility even further, while decreasing the visibility reduces its effect.

Lastly, it is worth noting that honest nodes of the peer network can determine whether or not their test blocks are being relayed. If the test blocks of a node are being relayed in the absence of ongoing node discrimination, nodes can directly relay their blocks to the system servers, and obscure the validity of the block even from its peers.

In addition to colluding to prevent block propagation, nodes might attempt to collude with the system servers to prevent or delay block delivery to a subset of the peer network nodes. When such an attack is launched against a small number of nodes, it is easily discovered by the targeted nodes, since their honest immediate peers, which are unknown to the colluders, will notify them of the blocks and encryption keys they receive. To protect themselves, discriminated nodes can request any of their immediate peers to relay to them all incoming blocks. Such a request does not place the discriminated node at the mercy of the selected peer(s), as the discriminated node continues to receive blocks from its other peers and from the system servers. Such a request also does not place a heavy burden on the peer(s), as they control the number of nodes to which they relay traffic. The presence of colluding nodes does not affect the effectiveness of the attack, which is identical to such an attack in a system using the p2p trustless model.

If such an attack is launched against a significant portion or the majority of non-colluding nodes, the dependence on peers to relay blocks becomes a hindrance. This is because nodes are not as efficient in propagating blocks as the system servers, giving colluders an advantage over non-colluding nodes. However, as the portion of discriminated nodes increases, a proportional portion of sentinel server operators become aware of the discrimination, causing them to activate the sentinel network, counter the attack, and abandon the system servers. In addition to discriminating against some of the nodes and/or blocks outlined above, it is possible for the BDN to completely terminate its service, either maliciously or as a result of system failure.

Unlike previously suggested scaling mechanisms, the deployment of the proposed BDN can be gradual, without requiring consensus or cooperation among nodes. It is possible for a portion of the nodes to use the BDN without any change to the protocol, and the decision of how to adjust the protocol in order to scale is then left to the miners and nodes of each cryptocurrency and blockchain. In this way, the miners and nodes are able to best utilize the benefits of the BDN in whichever way they see fit. Every node of every cryptocurrency or blockchain can work on top of the BDN, without being required to coordinate with any other node.

The relaying of encrypted blocks opens the door for malicious behavior and distributed denial of service (DDoS) attacks against the BDN and nodes, while communication among peers remains voluntary and at the discretion of each node. To prevent malicious behavior such as the sending of large volumes of traffic via the BDN to the entire peer network, the BDN employs a simple yet effective policy of bandwidth limitation. It is noted that the BDN should limit malicious behavior on the one hand, while still allowing nodes to continuously monitor the BDN using test blocks.

Given an average inter-block time interval $t_B$, and an average size of encrypted blocks which use IDs to represent their transactions B', the BDN limits the traffic arriving from each node to 3B' over a sliding window of $1500t_B$.

As an example, one can consider the scenario of Bitcoin aiming to achieve a throughput of 3,000 TPS using a block size of B=50 MB and an inter-block time interval of $t_B$=30 seconds among 50,000 nodes. If the BDN were to support it, and to reduce the transmitted block size to B'=0.5 MB, each node would be able to test its service over 5 times a day, while utilizing a download bandwidth of only 13 Mbps. As the peer network grows in size, the BDN can allow bandwidth-restricted nodes to receive only a subset of the blocks, or to have their peers relay blocks to them only after they the blocks are determined to be valid.

In summary, the proposed BDN is the first network of its type to include the described approaches to resolving the blockchain scaling problem. The proposed BDN introduces a centrally-managed network infrastructure to boost scalability, yet retains the decentralization of control over transactions in a blockchain. This decentralization is implemented via neutral and auditable network design. The proposed BDN is simultaneously scalable, neutral, and auditable. The scalability of the BDN increases system throughput by ~1000×, via efficient content dissemination and by providing a mapping service between transactions and short IDs to reduce the traffic volume. The BDN attains neutrality by supporting encrypted blocks and by obscuring the origin of blocks via peer relaying. Additionally, the BDN attains auditability by enabling clients to directly and actively probe the network in a systematic manner. The BDN is a protocol-agnostic and economically viable system capable of supporting multiple blockchains simultaneously, and fully unleashing their indisputable potential.

In an illustrative embodiment, any of the operations described herein may be performed by a computing system that includes a memory, processor, user interface, transceiver, and any other computing components. The operations can be stored as computer-readable instructions on a computer-readable medium such as the computer memory. Upon execution by the processor, the computer-readable instructions are executed as described herein.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention.

The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A peer node in a blockchain distribution network, the peer node comprising:
   a processor configured to generate an encrypted test block, wherein the encrypted test block is indistinguishable from an encrypted blockchain in the blockchain distribution network; and
   a transceiver operatively coupled to the processor and configured to:
   transmit the encrypted test block to a server for propagation throughout the blockchain distribution network; and
   receive a message from a second peer node in the blockchain distribution network, wherein the message indicates that the second peer node received the encrypted test block;
   wherein the processor is configured to determine an elapsed time between transmission of the encrypted test block and receipt of the message, and wherein the processor is configured to determine whether the peer node is being discriminated against with respect to blockchain transmissions based at least in part on the elapsed time.

2. The peer node of claim 1, wherein the message includes a time at which the second peer node received the encrypted test block.

3. The peer node of claim 2, wherein the processor is configured to determine a first test block arrival time based at least in part on the time included in the message, wherein the first test block arrival time comprises a first elapsed time that it took for the encrypted test block to arrive at the second peer node.

4. The peer node of claim 3, wherein the transceiver is configured to receive a second test block arrival time, wherein the second test block arrival time comprises a second elapsed time that it took for a second test block transmitted by the second peer node to arrive at a third peer node.

5. The peer node of claim 4, wherein the third peer node comprises the peer node.

6. The peer node of claim 4, wherein the processor is configured to compare the first elapsed time to the second elapsed time.

7. The peer node of claim 6, wherein the processor is configured to determine whether the peer node is being discriminated against with respect to blockchain transmissions based at least in part on the comparison of the first elapsed time to the second elapsed time.

8. The peer node of claim 7, wherein, responsive to a determination that the peer node is being discriminated against, the transceiver is configured to transmit a request to one or more peer nodes, wherein the request asks the one or more peer nodes to relay blockchain messages to the peer node.

9. The peer node of claim 1, wherein the transceiver is configured to transmit an encryption key for propagation in the blockchain distribution network, wherein the encryption key enables decryption of the encrypted test block.

10. The peer node of claim 9, wherein the encryption key is transmitted to the server.

11. The peer node of claim 9, wherein the transceiver transmits the encryption key after propagation of the encrypted test block in the blockchain distribution network.

12. A method of peer-to-peer communication in a blockchain distribution network, the method comprising:
   generating, by a processor of a first peer node, an encrypted test block, wherein the encrypted test block is indistinguishable from an encrypted blockchain in the blockchain distribution network;
   transmitting, by a transceiver of the first peer device, the encrypted test block to a server for propagation throughout the blockchain distribution network;
   receiving, by the transceiver, a message from a second peer node in the blockchain distribution network, wherein the message indicates that the second peer node received the encrypted test block;
   determining, by the processor, an elapsed time between transmission of the encrypted test block and receipt of the message; and
   determining, by the processor, whether the peer node is being discriminated against with respect to blockchain transmissions based at least in part on the elapsed time.

13. The method of claim 12, wherein the message includes a time at which the second peer node received the encrypted test block.

14. The method of claim 13, further comprising determining, by the processor, a first test block arrival time based at least in part on the time included in the message, wherein the first test block arrival time comprises a first elapsed time that it took for the encrypted test block to arrive at the second peer node.

15. The method of claim 14, further comprising:
   comparing, by the processor, the first elapsed time to a second elapsed time, wherein the second elapsed time comprises an amount of time that it took for a second test block transmitted by the second peer node to arrive at a third peer node; and
   determining, by the processor, whether the first peer node is being discriminated against with respect to blockchain transmissions based at least in part on the comparison of the first elapsed time to the second elapsed time.

16. The method of claim 15, further comprising, transmitting, by the transceiver and responsive to a determination that the first peer node being discriminated against with respect to blockchain transmissions, a request to one or more peer nodes, wherein the request asks the one or more peer nodes to relay blockchain messages to the first peer node.

17. The method of claim 12, further comprising transmitting, by the transceiver, an encryption key for propagation in the blockchain distribution network, wherein the encryption key enables decryption of the encrypted test block.

18. The method of claim 17, further comprising:
   determining, by the processor, that the encrypted test block has been propagated throughout the blockchain distribution network; and
   instructing, by the processor and responsive to the determining that the encrypted test block has been propagated throughout the blockchain distribution network, the transceiver to transmit the encryption key.

* * * * *